United States Patent
Bedford-Roberts

[19]

[11] Patent Number: 5,870,092
[45] Date of Patent: Feb. 9, 1999

[54] PAGE TURNING FACILITY

[75] Inventor: James Bedford-Roberts, Bristol, United Kingdom

[73] Assignee: Hewlett-Packard Company, Palo Alto, Calif.

[21] Appl. No.: 765,805
[22] PCT Filed: Jul. 28, 1994
[86] PCT No.: PCT/GB94/01629
§ 371 Date: Jan. 9, 1997
§ 102(e) Date: Jan. 9, 1997
[87] PCT Pub. No.: WO96/03698
PCT Pub. Date: Feb. 8, 1996
[51] Int. Cl.[6] .................................................. G06F 15/00
[52] U.S. Cl. ...................... 345/350; 345/348; 345/173; 345/177
[58] Field of Search .................................. 345/348, 349, 345/350, 173, 177

[56] References Cited

U.S. PATENT DOCUMENTS

| | | | |
|---|---|---|---|
| 4,855,725 | 8/1989 | Fernandez | 345/173 |
| 5,199,104 | 3/1993 | Hirayama | 345/350 |
| 5,237,651 | 8/1993 | Randall | 345/350 |
| 5,367,623 | 11/1994 | Iwai et al. | 345/350 |
| 5,463,725 | 10/1995 | Henckel et al. | 345/350 |
| 5,632,022 | 5/1997 | Warren et al. | 345/350 |

FOREIGN PATENT DOCUMENTS 9208182  5/1992  WIPO.

OTHER PUBLICATIONS

IBM Technical Disclosure Bulletin, vol. 36, No. 8, Aug. 1993, New York US pp. 237–239, XP390208.
'Page Flipping for User Interfaces' see the whole document.

*Primary Examiner*—Huynh Ba

[57] ABSTRACT

A device for storing information electronically and which has a pen-sensitive screen enabling a user to make freehand input has the screen divided into two areas—a main area and a subsidiary area adjacent the main area.

The user can tag items of freehand input causing a tag item to be displayed alongside the freehand input and can subsequently manipulate (eg delete, move, copy) the freehand input by selecting and manipulating the associated tag item.

Tag items provide a permanent way of structuring data and are an elegant way of uniting several data manipulations.

24 Claims, 2 Drawing Sheets

PAGE TURNING FACILITY

TECHNICAL FIELD

The present invention relates to devices for displaying pages of electronically stored information. The present invention relates particularly, but not exclusively, to handheld computer devices with a pen/stylus for user input and a relatively small display screen.

BACKGROUND ART

Known pen-based handheld devices for displaying pages of electronically stored information have used a variety of ways to facilitate page turning. One of these, the Amstrad 'PenPad', has a small screen with forward and backward facing arrows displayed next to the screen. The user can turn pages in the desired direction by touching the arrows. Holding the pen down achieves a constant predetermined page turning rate allowing the user to 'riffle' rapidly through pages in succession, although without being able to control the page turning rate.

Another known device is the Sharp 'Action Manager' which is another pen-based handheld device in which pages are displayed with turned up corners. On tapping such a corner with the pen, the page turns. There is no mechanism for riffling rapidly through pages.

Neither of these devices provides a naturalistic page turning facility.

Many word processing packages support a vertical scroll bar which scrolls through pages of electronically stored information as if they were attached top to bottom and this is also the approach used in the Tandy 'Zoomer' which is another pen-based handheld device. The disadvantage of this approach is that the scroll bar takes up screen space, which is a particular disadvantage for small screen devices. If there is no scroll block, the scroll facility is tantamount to a pair of arrows similar to the arrangement in the Amstrad PenPad.

DISCLOSURE OF INVENTION

According to the present invention we provide a device for displaying pages of electronically stored information comprising a pen/finger sensitive symbol enabling a user to browse the information by page turning wherein the symbol has page delimiters and the device is configured so that traversal of a page delimiter causes a predetermined number of pages to be turned.

The provision of page delimiters has the advantage of allowing the user greater control over page turning. The user can stroke the symbol repeatedly to riffle through pages and the rate of page turning is under direct user control. In order to make best use of limited screen size in a handheld device, the symbol is situated outside the active area of the display screen of the device.

Preferably, the predetermined number of pages is one so that a single page is turned on traversal of each page delimiter.

Preferably, traversal of a page delimiter causes tactile feedback to be provided to the user. For example, in a pen-based device the page delimiters may be ridges or indentations so that these can be felt by the user when traversed by the pen.

In the embodiment to be described, the symbol depicts an open book. Preferably, there is an arrow overlaying the book symbol. This arrow informs novice users of the function of the open book symbol.

In order to make best use of limited screen size in a handheld device, the symbol is situated beside, rather than on, a display screen of the device.

Alternatively, means are provided enabling a user to select a position relative to the symbol so as to cause a page at a corresponding position in the sequence of stored electronic information to be displayed.

BRIEF DESCRIPTION OF DRAWINGS

A particular embodiment of the present invention will now be described, by way of example, with reference to the accompanying drawings in which.

BEST MODE FOR CARRYING OUT THE INVENTION & INDUSTRIAL APPLICABILITY

Figure 1:
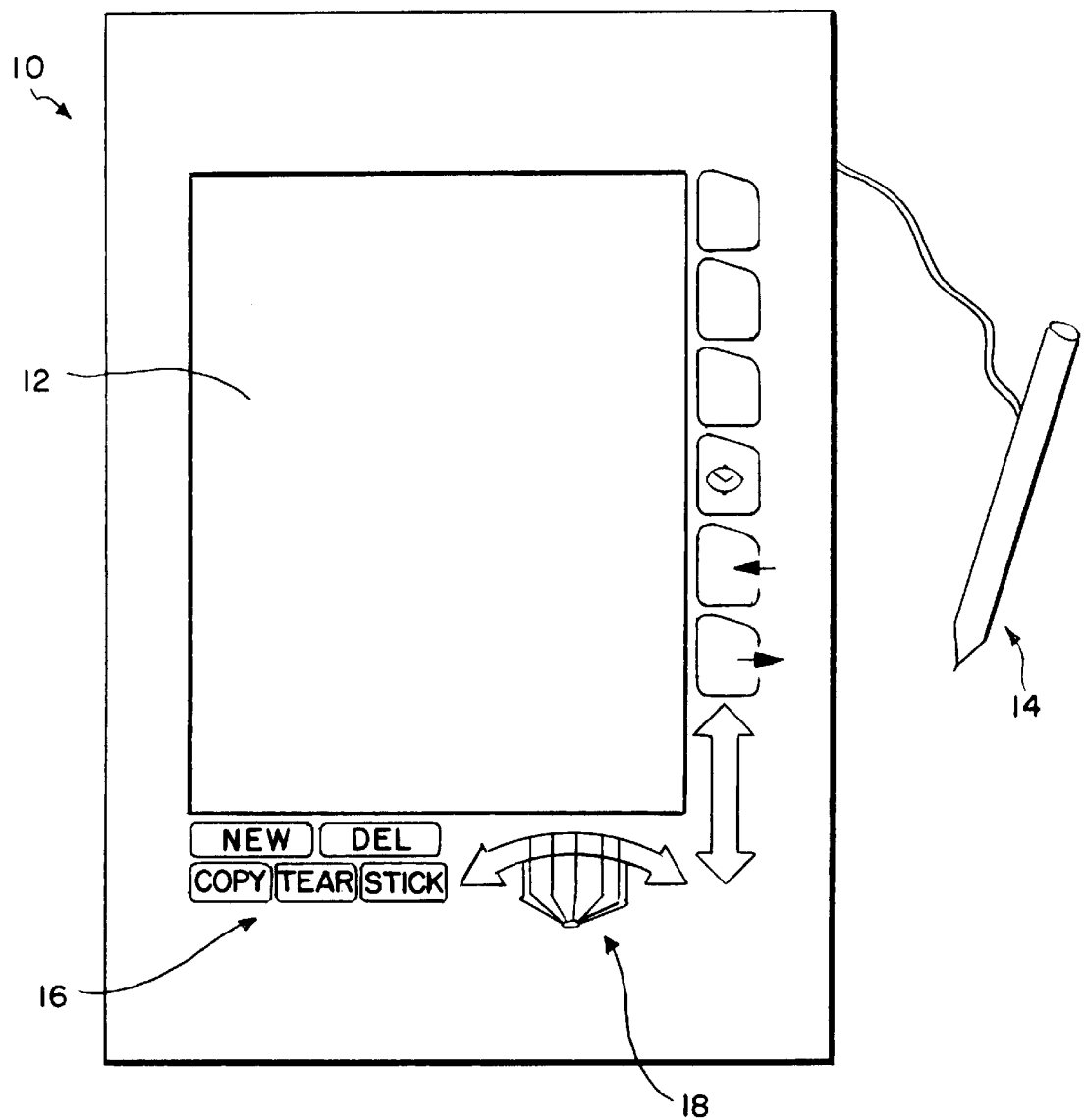
FIG. 1 is a diagram of a device according to the present invention.

FIG. 1 depicts a pen-based handheld device 10 for storing and displaying pages of electronic information comprising a display screen 12 and a pen 14 for user input. The device 10 also comprises buttons 16 for various functions (not relevant to the present invention) and a book symbol 18 for enabling users to browse pages of stored information.

Figure 2:
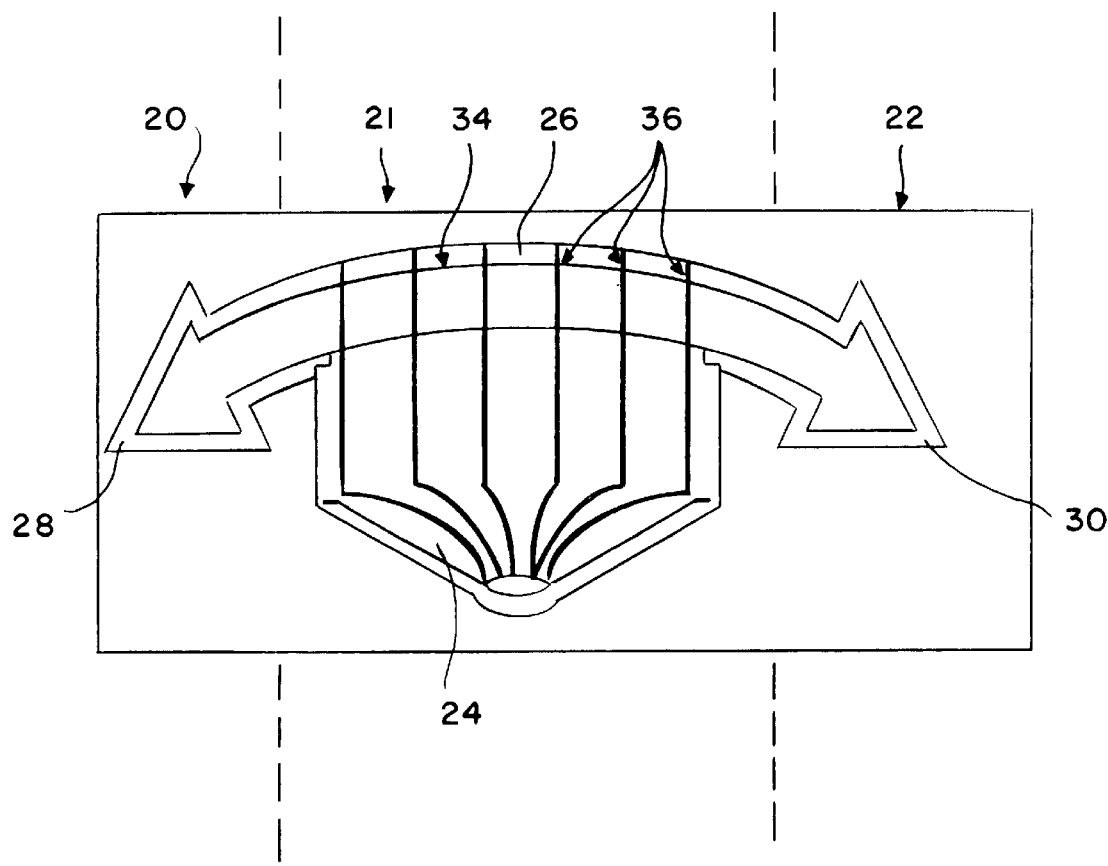
FIG. 2 shows a symbol depicting an open book.

FIG. 2 shows the symbol 18 in more detail. The symbol 18 is attached to the casing of the device 10. Electromagnetic sensors (not shown) are positioned within the casing and are spaced around the casing so as to sense movement of the pen on the screen 12 and on the off-screen buttons 16. An alternative to electromagnetic sensors would be pressure sensors.

The symbol 18 is notionally divided into three segments 20, 21 and 22, the boundaries between which are indicated by dotted lines in FIG. 2. The symbol 18 includes a representation 24 of an open book and a double-headed arrow 26. The left hand head 28 of the arrow 26 is in the region 20 and the right hand head 30 of the arrow is in the region 22. The book representation 24 and the body 34 of the arrow 26 are in the region 21. The software which handles data representing the signals from the pen sensors divides the symbol into the three regions 20, 21 and 22.

The book representation 24 comprises page delimiters 36 which are ridges formed in the symbol 18 which the user can feel as the pen 14 is moved over the symbol 18.

In use, as the user moves the pen 14 along the body 34 of the arrow, or indeed anywhere within the region 21, successive pages of stored information are displayed, depending on the direction of movement along the arrow body 34. As a page delimiter 36 is traversed by the pen 14, the next page in the direction of movement of the pen 14 is displayed. If the user taps one of the arrow heads 28 or 30, this causes the device 10 to display the next page in the direction indicated by the tapped arrow head. The device is configured so that a single tap anywhere in the regions 20 or 22 is interpreted as a tap on the respective arrow head 28 or 30.

In order to riffle through a large number of pages of stored information, the user repeatedly moves the pen 14 in a single direction in the region 21 over the body 34 of the arrow 26.

An example pseudo-code implementation of the above-described embodiment is as follows:

```
State myState;     /* one of: OVER_LEFT_ARROW_HEAD,
OVER_RIGHT_ARROW_HEAD, OVER_ARROW_BODY */
Position myLastPosition;   /* Last recorded position when rippling */
When_pen_down_over_book_icon(position){
    if(over_left_arrow_head(position))
        myState = OVER_LEFT_ARROW_HEAD;
    if(over_right_arrow_head(position))
        myState = OVER_RIGHT_ARROW_HEAD;
    if(over_arrow_body(position)){
        myState = OVER_ARROW_BODY;
    }
    myLastPosition = position;
    book_icon_grab_pen_focus( ); /* send future pen events to routines below . . . */
}
When_pen_dragged_and_book_icon_has_focus(position){
    /* Check whether user has moved onto arrow body from LEFT or RIGHT
arrowheads */
    if((myState == OVER_LEFT_ARROW_HEAD) or (mysState. ==
OVER_RIGHT_ARROW_HEAD)){
        if(over_arrow_body(position)) mystate = OVER_ARROW_BODY;
    }
    if(myState == OVER_ARROW_BODY){
        intpages = page_edges_crossed(position, myLastPosition));
        if(pages <0 or pages >0) do_ripple(pages);
        myLastPosition = position;
    }
}
When_pen_is_raised_and_book_icon_has_focus(position){
    if(myState == OVER_LEFT_ARROW_HEAD) turn_back_one_page( );
    if(myState == OVER_RIGHT_ARROW_HEAD) turn_forward_one_page( );
    release_pen_focus( );
}
```

In the code example above, the symbol 18 is sensed as a rectangular region subdivided into the three smaller rectangular regions 20, 21 and 22 representing (LEFT_ARROW_HEAD|ARROW_BODY|RIGHT_ARROW_HEAD).

The device 10 may be configured so that pages are riffled in one-to-one correspondence with page delimiters being traversed. Alternatively, successive pages may be displayed when the pen 14 is moved a predetermined distance along the arrow body 34. In this way a variable scaling factor can be used for riffling through pages of electronically stored information. The scaling factor may vary automatically according to the number of pages stored.

The above-described embodiment allows riffling to continue even if the pen 14 is dragged outside the region 21 of the symbol 18. The movement of the pen can still be sensed in the region just outside the symbol 18.

A further modification is for the user to be able to jump to a position in the collection of stored pages by tapping the pen 14 (or using some other defined gesture) on the corresponding part of the book representation 34. In other words, if the pen is tapped over the arrow body it may turn the book to a page corresponding to that percentage of the distance through the book. For example, by tapping the pen 14 on the middle of the book representation 34, the device 10 causes the page in the middle of the collection of stored pages to be displayed. In this case pages need only be turned in response to a pen-up movement over the book-icon. Pseudo-code for implementing this modification is as follows:

```
When_pen_up_over_book_icon(position){
    if(over_left_arrow_head)position))
        turn_back_one_page( );
    if(over_right_arrow_head(position))
        turn_forward_one_page;
    if(over_arrow_body(position)){
```

-continued

```
        offset = distance_from_left_edge_of_arrow_body(position);
        page = offset * total_number_of_pages( )/
        ARROW_BODY_WIDTH;
        turn_to_page(page)
    }
}
```

Although it is desirable in a small-screen device not to clutter the screen with icons, the symbol 18 could be implemented as an on-screen icon if desired.

The symbol 18 is positioned off-screen so as not to clutter the screen with icons. In some devices, the screen may have a marginal, non-active area and the symbol may be positioned there rather than on the device casing.

I claim:

1. A device for displaying pages of electronically stored information comprising a static symbol situated outside the active display area for enabling a user to browse the information in a page turning mode, wherein the symbol has a plurality of page delimiters, the device being configured so that traversal of each page delimiter causes a predetermined number of pages to be turned.

2. A device according to claim 1 wherein the predetermined number is one.

3. A device according to claim 1 wherein traversal of a page delimiter causes tactile feedback to be provided to the user.

4. A device according to claim 3 wherein the page delimiters are ridges.

5. A device according to claim 3 wherein the page delimiters are indentations.

6. A device according to claim 1 wherein the symbol depicts an open book.

7. A device according to claim 1 wherein the symbol is situated beside a display screen of the device.

8. A device according to claim 1 comprising means enabling a user to select a position relative to the symbol so as to cause a page at a corresponding position in the sequence of stored electronic information to be displayed.

9. A device according to claim 2 wherein traversal of a page delimiter causes tactile feedback to be provided to the user.

10. A device according to claim 2 wherein the symbol depicts an open book.

11. A device according to claim 3 wherein the symbol depicts an open book.

12. A device according to claim 4 wherein the symbol depicts an open book.

13. A device according to claim 5 wherein the symbol depicts an open book.

14. A device according to claim 2 wherein the symbol is situated beside a display screen of the device.

15. A device according to claim 3 wherein the symbol is situated beside a display screen of the device.

16. A device according to claim 4 wherein the symbol is situated beside a display screen of the device.

17. A device according to claim 5 wherein the symbol is situated beside a display screen of the device.

18. A device according to claim 6 wherein the symbol is situated beside a display screen of the device.

19. A device according to claim 2 comprising means enabling a user to select a position relative to the symbol so as to cause a page at a corresponding position in the sequence of stored electronic information to be displayed.

20. A device according to claim 3 comprising means enabling a user to select a position relative to the symbol so as to cause a page at a corresponding position in the sequence of stored electronic information to be displayed.

21. A device according to claim 4 comprising means enabling a user to select a position relative to the symbol so as to cause a page at a corresponding position in the sequence of stored electronic information to be displayed.

22. A device according to claim 5 comprising means enabling a user to select a position relative to the symbol so as to cause a page at a corresponding position in the sequence of stored electronic information to be displayed.

23. A device according to claim 6 comprising means enabling a user to select a position relative to the symbol so as to cause a page at a corresponding position in the sequence of stored electronic information to be displayed.

24. A device according to claim 7 comprising means enabling a user to select a position relative to the symbol so as to cause a page at a corresponding position in the sequence of stored electronic information to be displayed.

* * * * *